Nov. 16, 1937.    P. L. HEXTER    2,098,963
SURFACE CONTACT GAUGE FOR LIQUIDS
Filed Oct. 2, 1935

INVENTOR.
PAUL L. HEXTER
BY
Kwis, Hudson & Kent
ATTORNEYS

Patented Nov. 16, 1937

2,098,963

UNITED STATES PATENT OFFICE 2,098,963

SURFACE CONTACT GAUGE FOR LIQUIDS

Paul L. Hexter, Cleveland, Ohio, assignor to The Arco Company, Cleveland, Ohio, a corporation of Ohio Application October 2, 1935, Serial No. 43,201

5 Claims. (Cl. 33—126.7)

This invention relates to gauges for measuring the amount of liquid in a container, and has for one of its objects the provision of a simple and efficient device that will be capable of measuring the amount of liquid in a container of known capacity by accurately determining the height of the surface of the liquid.

The invention is especially adapted for use in connection with the paint mixing machine disclosed in my Patent No. 2,068,646, dated January 16, 1937, wherein definite quantities of paints of various colors are mixed for the purpose of producing a desired color or shade.

Other objects of the invention and the features of novelty will be apparent from the following description taken in connection with the accompanying drawing, in which Fig. 1 is an elevation of a container having a gauge embodying my invention associated therewith, certain parts being shown in section;

Figure 1:
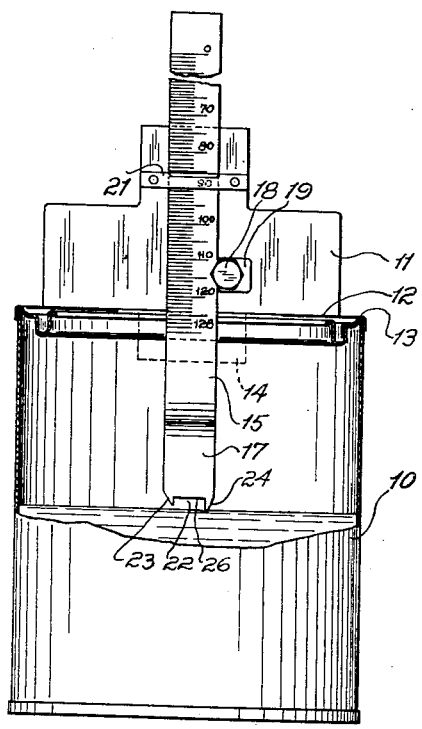

Referring to the drawing, 10 indicates an ordinary container such as is commonly used for packaging paints and other liquids. These containers, as now manufactured, are very accurate and uniform as to their dimensions so that it is possible to accurately determine the amount of liquid in the container by measuring the height of the surface of the liquid with reference to the top edge of the container.

Figure 2:
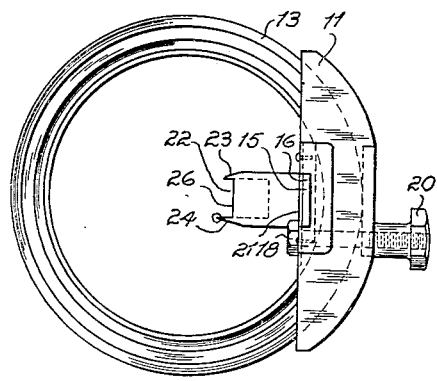
Fig. 2 is a plan view thereof.

A preferred form of gauge, embodying my invention, is illustrated in the drawing, and comprises a support 11 which is preferably made of considerable weight, from iron or other suitable material, and has an under surface 12 which is adapted to engage the top peripheral edge 13 of the container and be supported thereby in a condition of stability. As will be noted from Fig. 2, the support 11 engages the top peripheral edge 13 over a substantial part of the circumferential length of said edge. The support 11 is provided with a depending lug 14 that is adapted to engage the outer side of the wall of the container to position the support.

Figure 3:
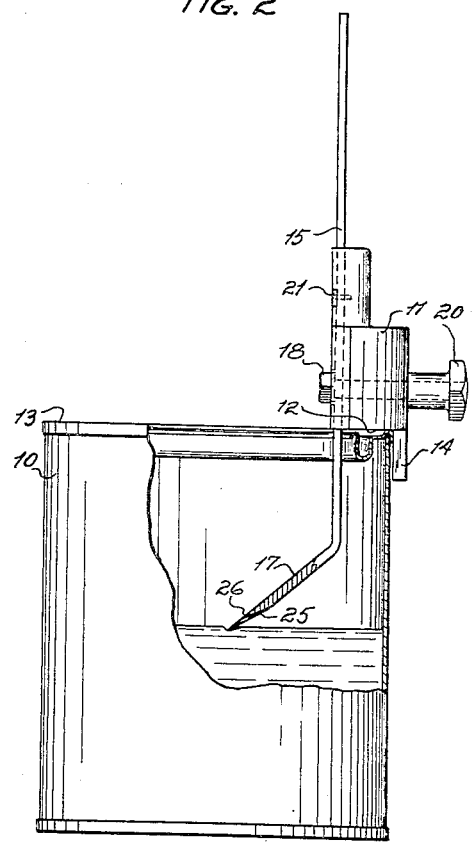
Fig. 3 is a side elevation with certain parts shown in section.

A rod or blade 15, preferably of rectangular cross-section, and generally similar to a metal scale or ruler, is slidably arranged in a recess 16 in the inner face of the support 11 and has its lower portion 17 bent to an angle, as shown in Fig. 3. A bolt 18 has its head in a recess 19, in the inner face of the support 11, so as to be held thereby against rotation and there is a hand nut 20 on the threaded end of the bolt 18 for clamping the blade 15 in any position to which it is adjusted. As will be noted from Fig. 1, the blade 15 is provided with a series of numbered graduations and an index bar 21 is secured to the support 11 and extends across the blade 15 so that the upper edge of this index bar may be used for the purpose of accurately positioning the blade 15 with its lower end at any desired elevation. The end of angular portion 17 of the blade 15 is provided with a rectangular recess 22 and its lateral edges are beveled to form the points or extensions 23 and 24. The portion 17 is also beveled as shown at 25, to form the knife edge 26.

The blade 15 is graduated so that, when any particular graduation coincides with the upper edge of the index bar 21, and the knife edge 26 is positioned at the surface of the liquid in the container, a definitely known quantity of liquid will be in the container. Hence when it is desired to put a definite quantity of liquid in the container the blade 15 is set so that the graduation, corresponding to this quantity, coincides with the upper edge of the bar 21, and the liquid is then run into the container until the surface meets the knife edge 26. In mixing paints of various colors to produce a desired color or shade, the blade is first set to measure a definite quantity of one of the constituent colors. When the desired amount of this particular color has been run into the container the blade 15 is then raised until another graduation coincides with the upper edge of the bar 21 and the second constituent color is run into the container until the surface again meets the knife edge 26. This operation is repeated until all of the colors have been added in the desired amounts and the cover is then put on the container and the various constituent colors are thoroughly mixed by shaking the container in any preferred manner.

In order to obtain any desired shade or color with certainty and uniformity, it is absolutely essential to mix accurately measured quantities of certain other colors, and these are determined in advance in a laboratory, or otherwise. Various methods of measuring the required amounts of the different constituent colors necessary to produce a desired shade or color have heretofore been used, but it has been impracticable by such methods to make accurate volumetric measurements of the quantities of these constituents that went into the ultimate mixture. In some of the prior methods, a graduate is used, but it is difficult to accurately measure small volumes of liquids in this device because of the inaccuracy in determining the level of the liquid in the graduate with reference to any particular graduation thereon, and because some of the material will adhere to the walls of the graduate when the contents are poured therefrom.

Figure 4:
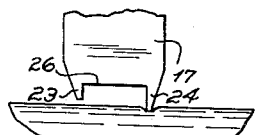
Figs. 4, 5 and 6 are diagrammatic views illustrating the various steps in the method of determining the height of the surface of the liquid in a container.
Figure 5:
Figure 6:
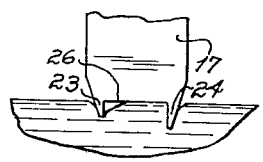

By my improved gauge I am able to accurately measure the quantity of liquid in the container, whether the liquid is opaque or clear, because of the accuracy of the gauge in determining the height of the surface of the liquid. When the gauge is set, as shown in Figs. 1 and 3, to measure a definite quantity, the liquid is run into the container until the surface reaches the tip of the tooth-like extension 24 on the blade 15, as shown in Fig. 4. This can be readily determined because an indentation will be formed in the surface of the liquid due to the surface tension thereof. The appearance of this indentation will be a warning to the operator that the surface is nearing the knife edge 26. Because of this warning the operator will then reduce the rate of flow of the liquid into the container until the tip of the shorter extension 23 forms an indentation in the surface, as shown in Fig. 5, and this will constitute a further warning or signal to the operator to again reduce the rate of flow. Soon after the indentation in the surface of the liquid is formed by the extension 23, the extension 24 will puncture the surface and the liquid will wet the extension 24, and the instant of contact of the surface of the liquid with the knife edge 26 may be accurately observed because of the fact that the wetting of the extension 24 will result in an extension of the wetted area across the knife edge from the extension 24 to the extension 23, as represented in Fig. 6. When this occurs the operator instantly stops the flow of the liquid into the container.

While I prefer to use the two extensions 23 and 24 on the blade 15 for the purpose of giving a double warning to the operator that the surface of the liquid is nearing the knife edge 26, it will be obvious that the shorter extension 23 may be eliminated and the gauge will function as above described, without the second warning that is afforded by the shorter extension 23. After the first of the constituent colors or liquids is run into the container, the gauge is removed from the container and the extensions 23 and 24 are cleaned and dried and the blade 15 reset at a higher elevation. For the purpose of measuring a definite quantity of the second constituent color or liquid to be added to that previously run in to the container, the gauge is then placed in position on the container and the second constituent color or liquid is run into the container until the surface thereof reaches the knife edge 26. These operations are repeated until all of the constituent colors or liquids are run into the container.

While I have illustrated and described the principles of my invention and what I now consider to be the preferred form of gauge embodying the same, it will be understood that various changes in the details of construction which I have illustrated and described may be made without departing from the spirit of the invention as defined in the appended claims.

Having thus described my invention, I claim:

1. A gauge of the class described comprising a support adapted to be positioned on the top of a container, a member adjustably mounted on said support, said member having a knife edge arranged substantially parallel with the surface of a liquid in said container and spaced extensions of different lengths below said edge which are adapted to contact with the surface of the liquid at successive levels below the level of said edge, when the container is being filled, and cooperating measuring means on said support and said member whereby said member is located in any desired position on said support.

2. A gauge of the class described comprising a support adapted to be positioned on the top of a container, a member adjustably mounted on said support, said member having a knife edge arranged substantially parallel with the surface of a liquid in said container and spaced extensions of different lengths below said edge which are adapted to contact with the surface of the liquid at successive levels below the level of said edge, when the container is being filled, the longer of said extensions being of sufficient length that it will puncture the surface of the liquid before said surface reaches said edge and cause said edge to be wet by the liquid as soon as it contacts with said edge, and cooperating measuring means on said support and said member whereby said member is located in any desired position on said support.

3. A gauge of the class described comprising a support adapted to be positioned on the top of a container, a member adjustably mounted on said support, said member having a knife edge arranged substantially parallel with the surface of a liquid in said container and spaced extensions of different lengths below said edge which are adapted to contact with the surface of the liquid at successive levels below the level of said edge, when the container is being filled, the longer of said extensions being of sufficient length that it will puncture the surface of the liquid before said surface reaches said edge and cause said edge to be wet by the liquid as soon as it contacts with said edge, the shorter of said extensions being of such length that it will not puncture said surface until after said edge has been wet by the liquid, and cooperating measuring means on said support and said member whereby said member is located in any desired position on said support.

4. A gauge of the class described comprising a support having means adapted to engage the top peripheral edge of a cylindrical container to hold the support in a definite relation to the bottom of the container, a bar adjustably mounted on said support and projecting into said container, the lower portion of said bar extending at an angle to the plane of said means and being provided with a recess in its lower end forming spaced tooth-like extensions with a straight knife edge therebetween, said extensions being of different lengths, and cooperating measuring means on said support and said bar whereby said bar is located in any desired position on said support.

5. A liquid gauge comprising a support adapted to be positioned on the top of a container, an adjustable measuring rod mounted on said support, said rod having a lower knife edge, a tooth-like depending projection formed at one end of said knife edge adapted to contact with and puncture the surface of the liquid before said surface reaches said edge and thereby cause said edge to be wet by the liquid as soon as it contacts with said edge.

PAUL L. HEXTER.